US008656177B2

(12) United States Patent
Putz

(10) Patent No.: US 8,656,177 B2
(45) Date of Patent: Feb. 18, 2014

(54) IDENTITY-BASED-ENCRYPTION SYSTEM

(75) Inventor: Ingrum O. Putz, Montara, CA (US)

(73) Assignee: Voltage Security, Inc., Cupertino, CA (US)

( * ) Notice: Subject to any disclaimer, the term of this patent is extended or adjusted under 35 U.S.C. 154(b) by 1320 days.

(21) Appl. No.: 12/144,292

(22) Filed: Jun. 23, 2008

(65) Prior Publication Data

US 2010/0017593 A1    Jan. 21, 2010

(51) Int. Cl.
*H04L 9/00* (2006.01)

(52) U.S. Cl.
USPC ............. 713/180; 713/176; 713/182; 380/37; 380/44

(58) Field of Classification Search
USPC ........ 713/150, 176, 180–182; 380/37, 44–47, 380/277
See application file for complete search history.

(56) References Cited

U.S. PATENT DOCUMENTS

| | | | |
|---|---|---|---|
| 5,550,919 A | 8/1996 | Kowalski | |
| 5,825,882 A | 10/1998 | Kowalksi et al. | |
| 5,910,989 A | 6/1999 | Naccache | |
| 6,459,791 B1 | 10/2002 | M'Raihi et al. | |
| 6,655,585 B2 | 12/2003 | Shinn | |
| 6,792,536 B1 | 9/2004 | Teppler | |
| 6,834,795 B1 | 12/2004 | Rasmussen et al. | |
| 6,839,840 B1 | 1/2005 | Cooreman | |
| 6,886,096 B2 | 4/2005 | Appenzeller et al. | |
| 6,914,986 B2 | 7/2005 | Handschuh | |
| 7,017,181 B2 * | 3/2006 | Spies et al. ......................... | 726/3 |
| 7,113,594 B2 | 9/2006 | Boneh et al. | |
| 7,185,199 B2 | 2/2007 | Balfanz et al. | |
| 7,574,499 B1 * | 8/2009 | Swildens et al. .............. | 709/223 |
| 2003/0081785 A1 | 5/2003 | Boneh et al. | |
| 2003/0084311 A1 | 5/2003 | Merrien et al. | |
| 2003/0172272 A1 | 9/2003 | Ehlers et al. | |
| 2003/0179885 A1 | 9/2003 | Gentry et al. | |
| 2003/0211842 A1 * | 11/2003 | Kempf et al. ................. | 455/411 |
| 2004/0172531 A1 | 9/2004 | Little et al. | |
| 2004/0179684 A1 | 9/2004 | Appenzeller et al. | |
| 2004/0240666 A1 | 12/2004 | Cocks | |
| 2005/0084100 A1 | 4/2005 | Spies et al. | |
| 2005/0138353 A1 | 6/2005 | Spies et al. | |
| 2006/0095771 A1 | 5/2006 | Appenzeller et al. | |
| 2006/0123238 A1 | 6/2006 | Kacker et al. | |

(Continued)

OTHER PUBLICATIONS

U.S. Appl. No. 11/983,154, filed Nov. 6, 2007, Boyen.

(Continued)

*Primary Examiner* — Hadi Armouche
(74) *Attorney, Agent, or Firm* — Treyz Law Group; G. Victor Treyz; David C. Kellogg

(57) ABSTRACT

A system is provided that uses identity-based encryption (IBE) to allow a sender to securely convey information in a message to a recipient. A service name such as a universal resource locator based at least partly on the name of an organization may be associated with a local key server at the organization and a public key server external to the organization. Users at the organization may use the service name to access the local key server to obtain IBE public parameter information for performing message encryption and to obtain IBE private keys for message decryption. External to the organization, users may obtain IBE public parameter information and IBE private keys from the public key server using the same service name. The local key generator and the public key generator may maintain identical copies of the same IBE master secret.

21 Claims, 12 Drawing Sheets

(56) References Cited

U.S. PATENT DOCUMENTS

2007/0050629 A1    3/2007    Gentry et al.
2007/0177731 A1    8/2007    Spies et al.
2009/0103734 A1*   4/2009    Hammell et al. ............ 380/278

OTHER PUBLICATIONS

Boneh et al. "Identity-Based Encryption from the Well Pairing," from Crypto '2001 (Oct. 2002).

* cited by examiner

IDENTITY-BASED-ENCRYPTION SYSTEM

BACKGROUND OF THE INVENTION

This invention relates to cryptographic systems, and more particularly, to identity-based-encryption systems.

Cryptographic systems are used to provide secure communications services such as secure email services and secure content distribution services. In providing these services, various messages must be securely conveyed between different parts of the system. For example, in a secure email system, a secure email message must be conveyed from a sender to a recipient. In secure content distribution environments, a service provider may distribute media files to subscribers in the form of encrypted messages.

With symmetric key cryptographic systems, the sender of a message uses the same key to encrypt the message that the recipient of the message uses to decrypt the message. Symmetric-key systems require that each sender and recipient exchange a shared key in a secure manner.

With public-key cryptographic systems, two types of keys are used—public keys and private keys. Senders may encrypt messages using the public keys of the recipients. Each recipient has a private key that is used to decrypt the messages for that recipient.

One public-key cryptographic system that is in use is the RSA cryptographic system. Each user in this system has a unique public key and a unique private key. A sender may obtain the public key of a given recipient from a key server over the Internet. To ensure the authenticity of the public key and thereby defeat possible man-in-the-middle attacks, the public key may be provided to the sender with a certificate signed by a trusted certificate authority. The certificate may be used to verify that the public key belongs to the intended recipient of the sender's message. Public key encryption systems such as the RSA system that use this type of traditional approach are referred to as PKE cryptographic systems.

Identity-based-encryption (IBE) systems have also been proposed. As with PKE cryptographic systems, a sender in an IBE system may encrypt a message for a given recipient using the recipient's public key. The recipient may then decrypt the message using the recipient's corresponding private key. The recipient can obtain the private key from a private key generator.

Unlike PKE schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key, so that a sender may create the IBE public key of a recipient by simply determining the recipient's email address.

In addition to using identity-based information, more generally applicable policy-based information may be used to form the IBE public key. As an example, a one-week expiration period may be imposed on all encrypted messages. This expiration date policy may be used to form the IBE public key (e.g., by basing the IBE public key on a date stamp). With this type of arrangement, recipients must satisfy the policy constraints set forth in the IBE public key before they can access the encrypted message content.

Although senders of IBE-encrypted messages need not look up a recipient's public key as with PKE schemes, senders must obtain so-called IBE public parameter information that is associated with the recipient's IBE private key generator. The IBE public parameter information is used as an ancillary input to the sender's IBE encryption algorithm and works in conjunction with the IBE public key of the recipient to ensure that the message is encrypted properly.

To create the IBE public parameter information and IBE private keys, an IBE private key generator must use secret information (called the "master secret s"). The security of the encrypted messages associated with this IBE private key generator rests on the ability of the IBE private key generator to maintain the secrecy of the master secret. Message security also depends on the measures taken by the IBE private key generator to authenticate a recipient before providing that recipient with an IBE private key. To maintain control over these aspects of system security and to enhance the delivery of services to local users, some organizations may want to maintain their own IBE private key generators.

In an environment in which an organization is maintaining an IBE private key generator, it can be disruptive to service large numbers of external users. For example, if the organization is a corporation that sends secure messages to millions of customers, it can be burdensome to handle millions of key requests using the IBE private key generator maintained by the organization.

It would therefore be desirable to be able to provide improved identity-based-encryption systems.

SUMMARY OF THE INVENTION

In accordance with the present invention, a system may be provided that uses identity-based encryption (IBE) to allow a sender to securely convey information in a message to a recipient.

An organization in the system may maintain a local domain name system server and a local IBE key server. The local domain name system server may maintain an entry mapping a service name for the local IBE key server to an Internet Protocol (IP) address for the local IBE key server.

Outside the organization, a public IBE key server may be associated with a cryptographic service. The public IBE key server and the local IBE key server may be accessed using the same service name. The service name may be associated with the name of the organization. A public domain name system server may maintain an entry mapping the service name to an IP address of the public IBE key server.

An identical IBE master secret may be maintained at both the local key server and the public IBE key server. Users inside the organization may use the local IBE key server to support IBE cryptographic operations. Users outside the organization may use the public IBE key server to support IBE cryptographic operations.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
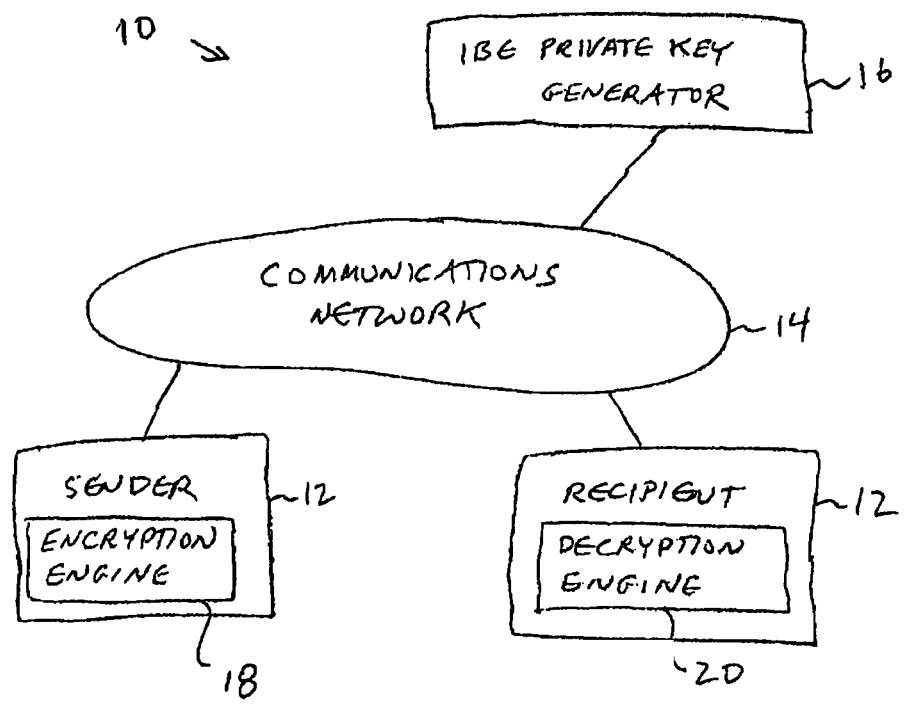
FIG. 1 is a diagram of an illustrative identity-based-encryption system in accordance with an embodiment of the present invention.

An illustrative identity-based-encryption (IBE) system 10 that may be used to support secure messaging is shown in FIG. 1. A user may send a secure message to one or more other users over a communications network 14. The users in the systems described herein may be individuals, automated processes (e.g., computer programs), or any other suitable users. Some of the users may be associated with organizations and may use equipment at the organization in performing cryptographic activities. Users such as these are typically associated with a network at the organization and may sometimes be referred to as local users or internal users. Other users in system 10, sometimes referred to as remote users or external users, may send and receive messages independently, not in direct association with the organization.

When a user is sending a message, the user may be referred to as a sender. When a user is receiving a message, the user may be referred to as a recipient. Users may, in different capacities, be both senders and recipients. Messages may include any digital information (e.g., text, graphics, audio, video, commands, executable code, data, etc.) that it is desired to convey electronically between senders and recipients in a secure manner.

Users may communicate with each other using equipment 12. Equipment 12 may, for example, include computing equipment such as a personal computers, portable computers, mainframe computers, networked computers or terminals, telecommunications equipment, handheld computers or personal digital assistants, or cellular telephones. Multiple individuals or organizations may use the same device. For example, a group of workers in an office may share the use of a single computer terminal that is connected to a host computer in a local area network. In some environments, the senders and recipients may use router equipment or other such network equipment to send and receive messages related to network set-up and maintenance. These are merely illustrative examples of the type of platforms that system 10 may use. Equipment 12 may be based on any suitable electronic equipment.

The equipment of FIG. 1 may be interconnected by communications paths in a communications network 14. Network 14 may be, for example, the Internet, a local area network, a wide area network, the public switched telephone network, a virtual private network, a wired network, a wireless network, a network including dedicated leased lines, a network based on fiber-optic or cable paths or other wired or wireless paths, or a network formed using any other suitable network technology or a combination of such networks.

System 10 can have multiple IBE private key generators 16 (sometimes referred to as key servers). Only one private key generator 16 is shown in FIG. 1, to avoid complicating the introductory portion of the description of the system. Aspects of the system that relate to the use of multiple IBE private key generators 16 (key servers) are discussed in more detail below.

Various computing devices may be used with network 14 to support secure messaging features. For example, computing equipment may be used to implement the functions of a server or other computer equipment at each IBE private key generator 16. Servers may also be used to support the functions of an IBE public parameter directory, an IBE public parameter host, a certificate authority, or other entities. Such servers may be co-located with a sender (e.g., a sender in an organization), may be connected to the network 14 as an independent third party service, may be part of the infrastructure of network 14, or may used at other locations.

A server may be formed using a single computer or multiple computers. Multiple servers may be implemented on one computer. If desired, the functions of a single server may be provided by multiple computers that are physically distinct. The functions implemented using servers in system 10 may generally be performed using other computer equipment configurations if desired, but the computing equipment for implementing these functions is generally referred to as a "server" or "servers" for clarity.

A sender may send a message to a given recipient over system 10 using any suitable messaging format. For example, an email message, an instant message (e.g., an AOL instant message, a Yahoo instant message, an MSN Messenger instant message, and ICQ instant message, an IBM/Lotus Sametime instant message, etc.), or other electronic messages (e.g., messages sent between network equipment such as ICMP messages or messages sent between corporate IT systems, etc.) may be sent. Email messages may be used in contexts in which the widespread acceptance of the standard email format is important. Instant messages are generally limited in size, but may be delivered with less delay (e.g., less than a second) than email messages (which are typically delivered in less than one minute). Most instant messages are currently transported using insecure protocols.

Messages may be used to securely distribute digital content such as video and audio multimedia content from a service provider to various users in the system. The users may, for example, be subscribers to a service offered by the service provider. In this type of environment, the service provider may be a sender of messages (e.g., encrypted movies and songs) and the subscribers may be message recipients.

For clarity, the present invention is sometimes described in the context of email messages. This is merely illustrative. Any suitable type of messages may be conveyed between senders and recipients if desired.

Some user activities in system 10, such as sending person-to-person email messages, involve at least some manual intervention. For example, a person who desires to send a personally-composed text message must type the message before it is encrypted and sent to the appropriate recipient.

Other user activities in system 10 may be entirely automated so that no human intervention is generally required. As one example, a banking institution associated with one device 12 may desire to use encrypted communications to deliver encrypted bank statements to account holders at other devices 12 over communications network 14. The statement preparation and distribution processes may be automated so that no operator intervention is generally needed at the banking institution's equipment once the system has been properly set up. User receipt of the statements may also be automated.

System functions involved in presenting on-screen options for humans to respond to (e.g., by clicking on them using a computer mouse) can be automated using software running on the components of the system. When a particular function may involve manual intervention or a computer-implemented operation will be clear from context in the following discussion.

During certain operations of system 10, certain entities (e.g., private key generators such as private key generator 16) may need to verify that a given party has permission to access the contents of a particular message or to perform certain functions. In general, the entity performing such authentication and authorization processes may use any suitable manual or automatic techniques. For example, a party may be asked to fax or mail a letter to an authenticating entity on the party's official letterhead, which is examined for authenticity by personnel or automated equipment at the authenticating entity. As another example, biometric identification techniques (e.g., fingerprint analysis, eye-scanning, handprint or voiceprint analysis, facial recognition methods, or in-person identification checks) may be used. Hardware-based arrangements (e.g., based on hardware tokens) may be used to establish identity. A user may provide credentials in the form of a pre-established user name and password. Certificate authorities may create digital certificates that help to verify the identities of certain parties. Digital signatures (e.g., signatures from a certificate authority or other entity that use PKE private keys and that can be verified using matching PKE public keys) may be used to ensure that a message or other signed information is associated with a particular party.

Sometimes authentication information and other information (in addition to the messages being sent from the senders to the recipients in system 10) such as IBE public and private keys must be conveyed between parties securely (e.g., between a sender and a private key generator or between a recipient and a private key generator, etc.). A number of different approaches may be used to convey information over network 14 securely. For example, information may be conveyed securely over a secure communications path such as a communications path that uses the secure sockets layer protocol (SSL) or other suitable secure protocol (e.g., TLS), a communications path may be trusted because it is under the control of a trusted party (e.g., the communications path may be physically under the control of a trusted party), and information may be conveyed securely by encrypting the information (e.g., in a message) before sending it over an insecure (or secure) link.

The operation of system 10 may involve the use of traditional public-key encryption cryptographic techniques such as used with RSA public-key cryptography. For example, the secure sockets layer protocol, which may be used to secure communications between parties when a web browser or other application is used, involves the use of certificates from trusted certificate authorities. Digital signatures can also be implemented using traditional public-key encryption techniques. These traditional public key cryptographic techniques are referred to herein as "PKE" cryptographic techniques.

The operation of system 10 also uses identity-based encryption (IBE) cryptographic techniques. These cryptographic techniques are referred to herein as "IBE" cryptographic techniques.

PKE and IBE encryption schemes use an asymmetric approach. Some information (so-called public key information) is used to encrypt messages. Other corresponding information (so-called private key information) is used to decrypt the encrypted message.

To enhance the efficiency of the IBE decryption and encryption processes, "two-step" decryption techniques may be used in which a message key (e.g., a symmetric message key) is used to encrypt the contents of a message prior to transmission to the recipient. The IBE process may then be used to encrypt the symmetric message key. The message that is sent from the sender to the recipient contains the IBE-encrypted message key and the message-key-encrypted message contents. At the recipient, the recipient can use the IBE private key to decrypt the message key. The message key may then be used by the recipient to decrypt the rest of the message. These two-step processes may be more efficient than "pure" or "single step" IBE encryption algorithms in which the IBE algorithm alone is used to encrypt the entire message. Both types of approaches (and analogous multi-layer IBE encryption approaches) are often generally referred to herein as simply "IBE" schemes for clarity.

IBE encryption schemes can be implemented using a number of different cryptographic algorithms. One such scheme is based on quadratic residues (see, e.g., "An Identity Based Encryption Scheme Based on Quadratic Residues," Eighth IMA International Conference on Cryptography and Coding, December 2001, Royal Agricultural College, Cirencester, UK, by Clifford Cocks). Another suitable scheme is based on elliptic curves (see, e.g., "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231-229, August 2001. With the approach described in the work of Boneh and Franklin, IBE encryption is based on the properties of bilinear maps such as a Weil Pairing or Tate Paring. For clarity, aspects of the present invention will sometimes be described in the context of an identity-based encryption scheme such as the elliptic curve implementation described by Boneh and Franklin. This is, however, merely illustrative. Any suitable approach for IBE encryption may be used with system 10 if desired.

Initially, when the system is set up, an IBE private key generator (e.g., IBE private key generator 16 of FIG. 1) obtains or generates a master secret s. For example, the private key generator may create a master secret from a number that is randomly generated at the private key generator by a processor housed inside a tamper-proof enclosure. The master secret may also be produced off-site and delivered to the private key generator 16. The master secret (also sometimes referred to as a secret master key or a master key) is secret information that will subsequently be used by the private key generator 16 to generate private keys for recipients in the system to use in decrypting messages and to generate public parameter information for use by senders in encrypting messages.

After the master secret s has been obtained, the private key generator may generate the public parameter information. In the identity-based encryption approach of the above-mentioned work of Boneh et al., the public parameter information that is generated includes public parameters P and sP. The parameter P may first be generated by the IBE private key generator (e.g., using a random number generator). The parameter sP may then be generated by the IBE private key generator. The "multiplication" of s by P in the Boneh and Franklin work is accomplished using the multiplication of integers with points on elliptic curves. While multiplication (calculating sP) is straightforward, the inverse operation (determining s from knowledge of P and sP) is so computationally expensive that it is impractical for an attacker to obtain s in this way.

The public parameter information (e.g., the parameters P and sP in an identity-based encryption process based on elliptic curves) may be numbers. In general, there is an equivalency between numbers, letters, symbols, and other such schemes for representing information. Sometimes certain information (e.g., the master secret or public parameters) may be described as being in number form and sometimes certain information (e.g., a user's identity) may be described as being at least partly in character form (e.g., in the form of an email address). Because of the inherent equivalency between these different representational schemes, the techniques involved in converting letters or symbols into numbers or for representing multiple numbers or strings as a single number or other such operations are not described in detail herein.

After the public parameter information (e.g., P and sP) has been generated, the IBE private key generator 16 may make this information available to senders in system 10. For example, private key generator 16 may publish the public parameter information by placing the public parameter information on a particular server that a sender can reach using an associated domain name or other suitable service name. The server may be the same server or a different server from that used to support IBE private key generator operations such as supplying IBE private keys. For clarity, illustrative arrangements in which the same server is used in implementing both IBE private key generator functions such as private key generation and public parameter host functions are described herein as an example. In this type of arrangement, an IBE private key generator may sometimes be referred to as a key server. The key server can handle operations such as user authentication, access policy enforcement, IBE private key generation, and IBE public parameter generation. These functions may be performed using cryptographic software applications that run on computing equipment such as a personal computer, a workstation, a mainframe, a network of computers, etc.

If the IBE public parameter information includes more than one parameter, the parameters may be provided to the users together or separately. For example, parameters P and sP may be provided to a user together in a single transmission or separately in two transmissions. If parameters P and sP are provided separately, each parameter may be distributed using a different distribution mechanism. For example, P may be provided to a user over a secure sockets layer path and sP may be conveyed to the user in an encrypted email message. As another example, all users may know P in advance and sP may be distributed electronically. If desired, P may be the same for all or substantially all users in the system. Moreover, P and sP may be combined to form the equivalent of a single number or parameter or may be subdivided (e.g., to form three or more public parameter sub-parts). If desired, some of the public parameter information may be distributed manually (e.g., by printed mail or by distributing a memory card or other computer-readable media to the user).

Once the public parameter information (e.g., public parameters P and sP) has been provided to a user (i.e., a sender) who desires to send an encrypted message to another user (i.e., a recipient), the sender may encrypt and send the message to the recipient. Message encryption may be performed using the IBE public key of the recipient. Message decryption may be performed using a corresponding IBE private key. Encryption and decryption operations may, in general, be performed at the user's equipment (e.g., on the personal computer of a sender or recipient), on equipment associated with a user's organization (e.g., a gateway or other equipment associated with a user's organization other than the user's workstation), or using services at remote locations (e.g., servers that are accessible over the internet). Remotely located services may be implemented by third parties, by an organization associated with a sender or recipient, or using other suitable arrangements.

Consider, as an example, the arrangement of FIG. 1. In this type of arrangement, an IBE encryption engine 18 implemented on a sender's equipment may be used to encrypt a message. The IBE encryption engine 18 may use the public parameter information (e.g., P and sP) and the IBE public key associated with a recipient to perform message encryption. When the recipient receives the IBE-encrypted message, or earlier, when the recipient sets up or updates the equipment at the recipient's location, the recipient may obtain the recipient's IBE private key from the IBE private key generator 16 to use in decrypting the message. The recipient may use an IBE decryption engine 20 implemented on the recipient's equipment to decrypt the message.

The IBE encryption engine 18 and decryption engine 20 may use software to implement the desired IBE encryption and decryption algorithms. Engines 18 and 20 may be provided to users in the system as part of the users' initially-loaded messaging software, as a downloadable program or plug-in, or using any other suitable technique.

Identity-based encryption (IBE) is so named because the encryption process at the sender uses an IBE public key Q that is generally based on the recipient's identity. The identity of a user in an IBE encryption scheme may be represented by any suitable string, number, or symbol. For example, the identity of a message recipient may be represented by that recipient's email address, name, or social security number. An advantage of IBE schemes is that a sender can generally determine the identity (e.g., the email address) of an intended recipient without all of the complexities involved in obtaining the PKE-public key of the intended recipient as would be required with traditional PKE schemes such as the RSA cryptographic scheme. For example, the IBE public keys may be the same as (or based on) user email addresses, which are readily obtainable.

The IBE private key generator 16 may generate IBE private keys for each of the multiple users associated with that IBE private key generator based on the IBE public keys (the Q's) of each of these users (e.g., based on the users' identities).

The form of IBE public key Q that is used for a given IBE scheme depends on the security features that are desired. For example, user privileges may be made to automatically expire by automatically concatenating a validity period (e.g., a date or date range such as the current day of the year and year, the current month, starting and ending dates such as Jan. 2, 2003-Jan. 10, 2003, or any other suitable time-related date-stamp information) with each user's email address to form Q values based not only on the users' identities (i.e., email addresses) but also validity period information. The validity period acts as an access policy for the encrypted message that is more generally applicable than the user-specific email address identity information.

According to the validity period, it is not permissible to access the contents of the encrypted message if the current date does not fall within the validity period. The policy may be enforced by the private key generator 16. If the current date is not within the validity period specified in the public key, the private key generator 16 will refuse to generate and provide an otherwise authorized message recipient with a copy of the corresponding private key that is needed to decrypt the message. With this approach, private keys do not have unlimited lifetimes, which enhances the security of the system.

As another example, users' privileges may be restricted based on security clearance level. With this approach, security clearance level information may be concatenated or otherwise added to each user's email address when forming the public keys Q (i.e., Q=joe@navy.com|top_secret, etc.). These approaches are merely illustrative of the ways in which policy-based criteria may be added to a user identity such as a user email address when forming the IBE public key for each user (e.g., the Q for each user). Any suitable approach for forming IBE public keys based on user identity information and additional criteria may be used if desired.

A sender desiring to send an IBE-encrypted message should have information sufficient to construct the IBE public key Q of the intended message recipient. This information may include information on an individual recipient's identity (e.g., an email address), information on how to construct the IBE public key Q from suitable access policy information (e.g., validity period, security level, subscription level, content rating, geographic region, etc.), or any other suitable identity information and/or generally-applicable access policy information that specifies which parties are allowed to access the contents of the message and under what conditions such access is permitted.

The sender must also obtain the public parameter information (e.g., P and sP) associated with the intended recipient of the message prior to message transmission.

Once the sender has the IBE public key of the recipient and the appropriate corresponding public parameter information, the sender may use the IBE encryption process (e.g., the process of the work of Boneh and Franklin described above) to encrypt the message contents for the recipient. The IBE process may be implemented using software at the sender's equipment such as IBE encryption engine 18 (as an example). The encryption engine 18 may be a stand-alone process or application or may be incorporated into another process or application. If desired, such a process or application (whether stand-alone or multi-function) may be referred to as a user's "client" software or "client." An IBE encryption engine such as IBE encryption engine 18 may take as inputs (1) the message to be encrypted, (2) the IBE public parameter information (e.g., P and sP), and (3) the IBE public key Q. The IBE process implemented using the IBE encryption engine 18 produces an encrypted version of the message as its output.

The sender may transmit the encrypted message to the recipient using an email program or other suitable software. After the sender transmits the IBE-encrypted message to the recipient over communications network 14, the recipient may receive the message. The recipient may decrypt the received message using an appropriate IBE private key. The recipient may use decryption engine 20 to decrypt the message. The IBE private key that is used for decrypting the message is related to the IBE public key Q and public parameter information (e.g., P and sP) used when encrypting the message. Only the IBE private key that matches the IBE public key that was used to encrypt the message may be used to decrypt the message. Generation of the IBE private key requires knowledge of the master secret s, so only an appropriate private key generator 16 can generate the recipient's IBE private key based on the recipient's IBE public key Q.

With one suitable approach, the IBE private key for the recipient may be generated from the recipient's IBE public key Q and the master secret s by using an appropriate mathematical function (e.g., the multiplication of integers with points on elliptic curves) to calculate the value of sQ.

The recipient's authorization to receive the message may be verified using authentication information (credentials) from the recipient and using other information (e.g., independently-gathered information on the current date). The private key generator 16 may use an access policy embodied in the IBE public key to determine whether a given recipient is authorized. Once the IBE private key generator 16 verifies that the recipient is authorized to access the message contents, the private key may be issued to the recipient by the IBE private key generator 16.

If desired, the IBE private key generator 16 and the recipient may use intermediate parties as agents during the process of providing recipient credentials, verifying the recipient's authorization to access the message content, and providing the IBE private key. In general, any suitable manual or automatic authentication technique may be used by the IBE private key generator 16 to verify that the recipient (or the recipient's agent) is authorized to receive the IBE private key prior to issuing the key to the recipient.

Regardless of how the IBE private key generator 16 determines that the recipient is authorized to obtain the IBE private key, in arrangements in which the recipient's client handles decryption operations, the private key should be provided to the recipient for use in decrypting the message. Any suitable technique may be used to provide the IBE private key to the recipient. For example, the private key may be transmitted to the recipient in an email or other suitable message or may be made available for downloading over the Internet or other network (as part of a stand-alone downloadable application or a downloadable plug-in module, as a stand-alone key, etc.). A secure communications channel may be used for electronic communications between the IBE private key generator 16 and the recipient's equipment 12.

The recipient may, if desired, store the private key locally (e.g., in a database on a storage device such as a memory circuit or hard drive on the recipient's equipment). If the private key is stored locally (and has not expired or otherwise become obsolete), the recipient can retrieve it the next time a message needs to be decrypted without needing to contact the IBE private key generator 16 to obtain a new copy of the IBE private key over the communications network.

The sender may cache public parameter information on the sender's equipment in a similar fashion to facilitate retrieval of the public parameter information when it is desired to send an encrypted message.

Figure 2:
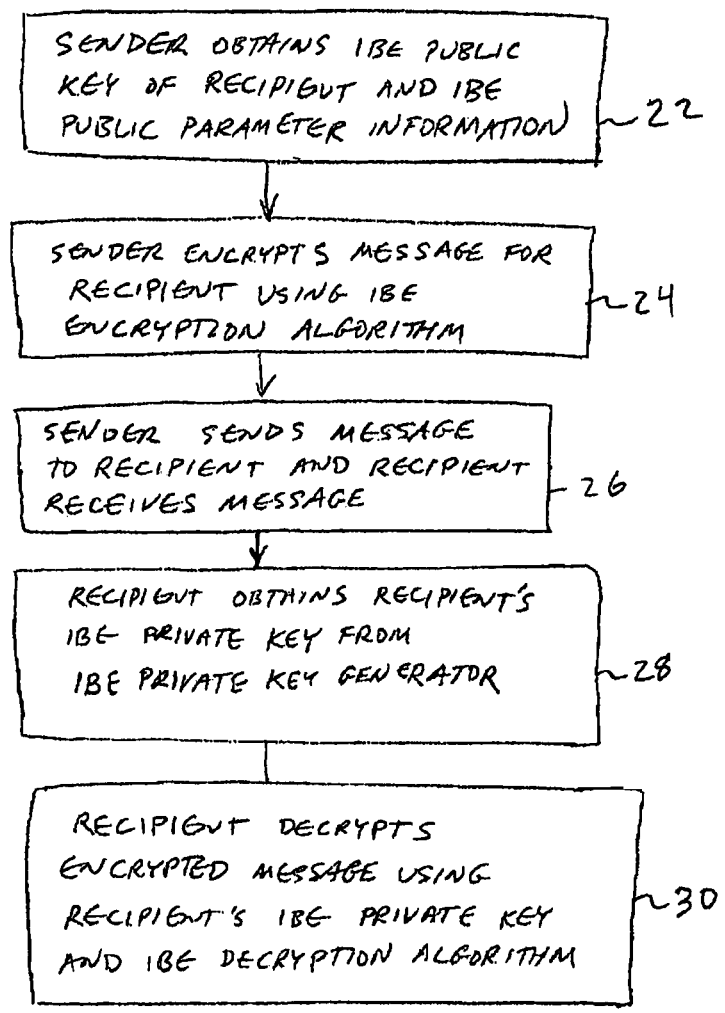
FIG. 2 is a flow chart of illustrative steps involved in using identity-based-encryption techniques to support secure messaging in accordance with an embodiment of the present invention.

Illustrative steps involved in using IBE-encryption to convey a secure message from a sender to a recipient in system 10 are shown in FIG. 2. At step 22, the sender may obtain the IBE public key Q of the intended recipient and the associated IBE public parameter information (e.g., parameters P and sP). The IBE public key Q may be obtained from a source that has a copy of the appropriate IBE public key Q or may be generated based on known rules (e.g., by obtaining the recipient's email address or other identity information, by determining a suitable validity period or other generally-applicable access policy information, and by using this information to generate Q). The IBE public parameter information may be obtained from the recipient or other suitable party, may be obtained over a local network, may be obtained over network 14 from a directory service (e.g., a directory service implemented on a server connected to network 14), or may be obtained over network 14 from a generator 16 or a host associated with the IBE private key generator 16 that generated the public parameter information. The IBE public key Q and IBE public parameter information may be cached locally by the sender for later retrieval if desired.

At step 24, the sender may use IBE encryption engine 18 (FIG. 1) to encrypt a message for the recipient.

The IBE-encrypted message may be sent to the recipient over network 14 and received by the recipient at step 26. The message may be accompanied by information on the IBE public key Q that was used to encrypt the message, information on which organization the sender is affiliated with (e.g., an organization name), a service name associated with one or more key generators, etc. This information may be used by the recipient in determining which private key generator 16 to contact at step 28 to obtain the IBE private key needed to decrypt the message.

To obtain the IBE private key from the private key generator at step 28, the recipient may provide information on Q (e.g., Q, a precursor of Q, or a derivative of Q) to the private key generator that the private key generator can use to determine which private key is being requested (and which access policies apply). The recipient can provide the private key generator with recipient credentials such as username and password information, biometric information, age information, and other suitable identity and authentication information that the private key generator 16 may use to verify that the recipient is authorized to obtain the requested IBE private key.

If desired, certain access policies may be implicit. Moreover, a private key generator may use its own information (e.g., information on the current time and date) as well as recipient-provided information in determining whether or not a given recipient is authorized to obtain the IBE private key. During the authentication process, the recipient and the IBE private key generator may communicate using secure communications (e.g., using PKE-encrypted messages, a trusted communications path, a secure communications link such as an SSL or TLS link, etc.).

When a private key generator 16 determines that the recipient is authorized to obtain a copy of the IBE private key, the private key may be provided to the recipient securely at step 28 (e.g., in a secure message or over a secure communications link in network 14).

At step 30, after the recipient has obtained the appropriate IBE private key, the recipient may use this private key with decryption engine 20 (FIG. 1) to decrypt the encrypted message.

There are typically many private key generators 16 in system 10, so it is helpful when the sender sends the IBE public key Q to the recipient with the message. The recipient may use the information on the IBE public key Q that is provided with the message in requesting the appropriate IBE private key from the IBE private key generator. For example, the recipient may determine from Q that the needed IBE private key may be obtained from an IBE private key generator 16 that is associated with a movie subscription service or the recipient may determine from Q that the needed IBE private key is to be obtained from a private key generator 16 that is associated with the recipient's bank. The recipient may pass Q to the private key generator when requesting the corresponding private key.

Figure 3:
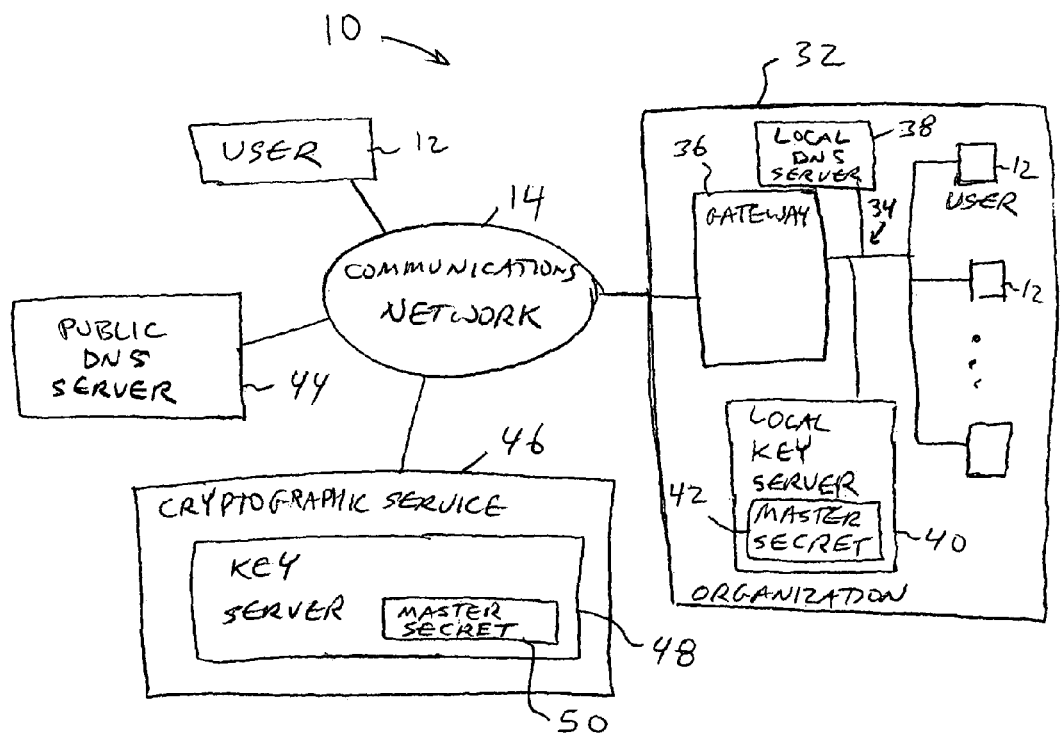
FIG. 3 is a diagram showing how local users at an organization may securely communicate with remote users over a communications network using identity-based encryption in accordance with an embodiment of the present invention.

In some arrangements for system 10, at least some of the users in system 10 may be associated with an organization. This type of system is illustrated in FIG. 3. As shown in FIG. 3, some users 12 in system 10 may be associated with organization 32. These users 12 may be, for example, employees of organization 32. In this type of arrangement, resources associated with organization 32 may be used in performing IBE encryption and decryption operations. Other users 12 (e.g., external users) in system 10 may not be associated with an organization that is able to assist in IBE encryption and decryption operations. As an example, these other users 12 may not be employed by an organization or may be employed by an organization without cryptographic resources for supporting IBE functions.

As shown in FIG. 3, organization 32 may have equipment such as gateway 36, local domain name system server 38, and local key server 40 (i.e., a local IBE private key generator). This equipment and the equipment of the users 12 that are associated with organization 32 may be interconnected using network 34 (e.g., a local area network, a wide area network, a combination of such networks, etc.).

Gateway 36 may be used to implement a firewall and functions such as virus scanning. Gateway 36 may also, if desired, be used in implementing cryptographic policies. For example, gateway 36 may process outgoing messages to determine whether they should be encrypted. If encryption is warranted, gateway 36 may encrypt the message or may direct other equipment to encrypt the message before the message is sent over network 14.

Local key server 40 may be used to generate IBE private keys and IBE public parameter information using master secret 42. This information may be distributed over network 34. Encryption and decryption may be performed at each user 12 or at gateway 36. For example, an incoming IBE-encrypted message may be decrypted at gateway 36 using the IBE private key of the intended recipient or the incoming IBE-encrypted message may be decrypted at the user equipment 12 of the intended recipient using the IBE private key of the recipient. Similarly, encryption may be performed with a client implemented on a user's equipment 12 or at gateway 36.

Local domain name system server 38 may be used to map domain names into internet protocol (IP) addresses. Domain name system server 38 may contain one or more tables that contain entries mapping universal resource locators (URLs) to corresponding IP addresses. In a typical arrangement, users on network 34 may consult local domain name system server 38 for information on which IP address corresponds to a given URL before consulting external sources for this information such as public domain name system server 44. Local domain name system server 38 is generally not available to users outside of organization 32. Users within organization 32 may have client software that is configured to check local domain name system server 38 for a given IP address before checking public domain name system server 44 for the address.

Users may use local domain name system server 38 to obtain IP addresses corresponding to any suitable URLs. As an example, a service name that identifies the location of local key server 40 on network 34 may be generated in the form of a URL by client software at a particular user or by software running on gateway 36. The service name might be, for example, "voltage-pp-0000.acme.com" in the situation in which the name of the organization 32 is "acme.com" or "acme." The string "voltage-pp-0000" may identity the URL as being an IBE service name. Local domain name system server 38 may contain an entry that maps this URL to the IP address for local key server 40, thereby allowing key server 40 to be located when needed to dispense IBE public parameters or IBE private keys.

Local key server 40 may, if desired, be accessed by remote users (i.e., external users not associated with organization 32) over network 14. This type of arrangement may, however, become burdensome for organization 32. For example, if organization 32 is a bank that is sending its customers millions of IBE-encrypted messages, it may be burdensome for organization 32 to support millions of resulting IBE private key requests from recipients of the messages.

To relieve this burden, remote users in system 10 can use the external services available through a service such as cryptographic service 46. Cryptographic service 46 may, for example, be used for encryption and decryption. As shown in FIG. 3, cryptographic service 46 may include a key server 48 having a master secret 50. Master secret 50 may be, for example, identical to master secret 42 at local key server 40. When a remote user desires to perform a cryptographic operation, that user may access cryptographic service 46, rather than relying on the resources available at organization 32. For example, when a remote user desires to decrypt an IBE-encrypted message received from a user at organization 32, the remote user may obtain an IBE private key from key server 48 or may ask cryptographic service 46 to perform decryption on behalf of the remote user.

To formulate an IBE private key request or other such request (e.g., a request for IBE public parameters), a remote user may construct a service name (e.g., using the same type of service name generation rule that is used internally at organization 32). For example, a remote user that has received an IBE-encrypted message from a user at acme.com or that desires to send an IBE-encrypted message to a user at acme.com may generate a service name (URL) such as "voltage-pp-0000.acme.com". This service name may be used in accessing cryptographic service 46 over communications network 14. In particular, the remote user may submit this URL to public domain name system server 44. Public domain name system server 44 may contain an entry that maps this URL to a given IP address. The given IP address may correspond to cryptographic service 46 (key server 48). After the IP address for service 46 has been obtained from public domain name system server 44, the remote user can use the IP address to request an IBE private key from key server 48 (as an example) without need to burden local key server 40.

Figure 4:
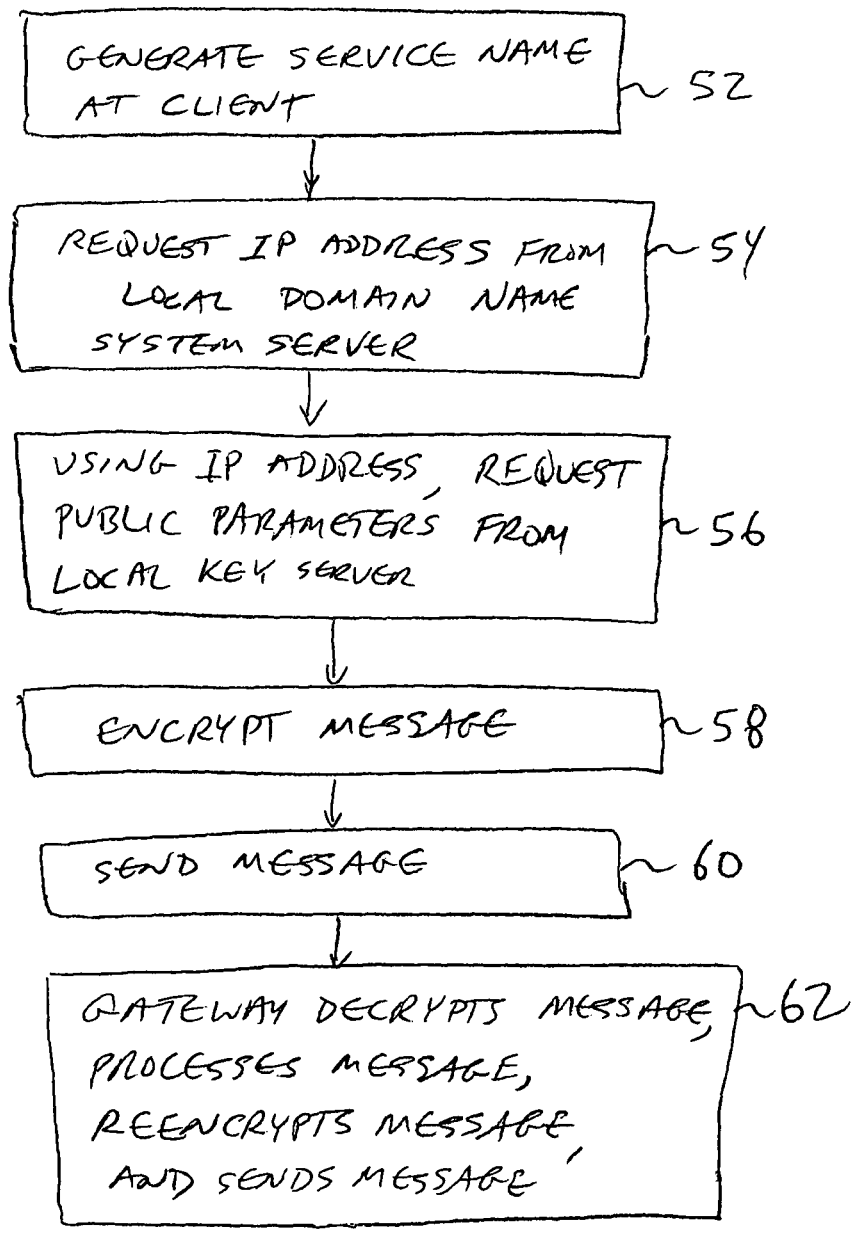
FIG. 4 is a flow chart of illustrative steps involved in sending secure IBE messages from a sender with a client encryption application at an organization to a remote recipient in accordance with an embodiment of the present invention.

Consider, as an example, the scenario in which a local sender (e.g., one of the users attached to network 34) at organization 32 has a client application with which to send an IBE-encrypted message to a remote recipient (e.g., a user connected to network 14). Illustrative steps involved in securely conveying a message from the local sender to the remote recipient are shown in the flow chart of FIG. 4.

At step 52, the client associated with the local sender may generate a service name. The service name may be formed, for example, by concatenating the name of organization 32 (e.g., the domain name "acme.com" for Acme corporation) with a known string (e.g., "voltage-pp-0000."), thereby forming the service name URL "voltage-pp-0000.acme.com" (in this example).

This service name may be used in accessing local key server 40 to obtain IBE public parameters for use in encrypting the sender's message. If desired, this service name may be constructed (or used) only after the client has failed to obtain the public parameters using a service name that was constructed based on the identity of the recipient (e.g., a service name constructed from the recipient's email address).

To access local key server 40, the client uses the service name ("voltage-pp-0000.acme.com") to request an IP address for local key server 40 from local domain name system server 38 (step 54). Local domain name system server 38 returns an IP address for local key server 40 (e.g., IPADD1) to the client.

At step 56, the client uses the IP address that was obtained from the local domain name system server at step 56 to formulate a request for the IBE public parameters needed to encrypt the message. In particular, the IP address (e.g., IPADD1) is used by the client to make the IBE public parameter key request to local key server 40. In response to the request, local key server 40 may generate the IBE public parameters using master secret 42. The IBE public parameters may be returned to the client over network 34.

At step 58, the client may use the IBE public parameters obtained from the local key server 40 to encrypt a message for the remote recipient (e.g., using an IBE encryption engine such as engine 18 of FIG. 1).

At step 60, the local sender may use the client to send the IBE-encrypted message to the remote recipient. The encrypted message may be sent to the recipient without intervention by equipment at organization 32 or, if desired, gateway 36 may process the outgoing message. For example, gateway 36 may obtain an IBE private key for decryption and IBE public parameters for encryption, may decrypt the encrypted message, may process the decrypted message by performing virus scanning or other suitable functions, may re-encrypt the message using the IBE public parameters, and may send the re-encrypted message to the remote recipient over network 14.

If desired, encryption may be performed at gateway 36 without initial encryption by a client encryption engine. This type of arrangement is illustrated in the flow chart of FIG. 5.

Figure 5:
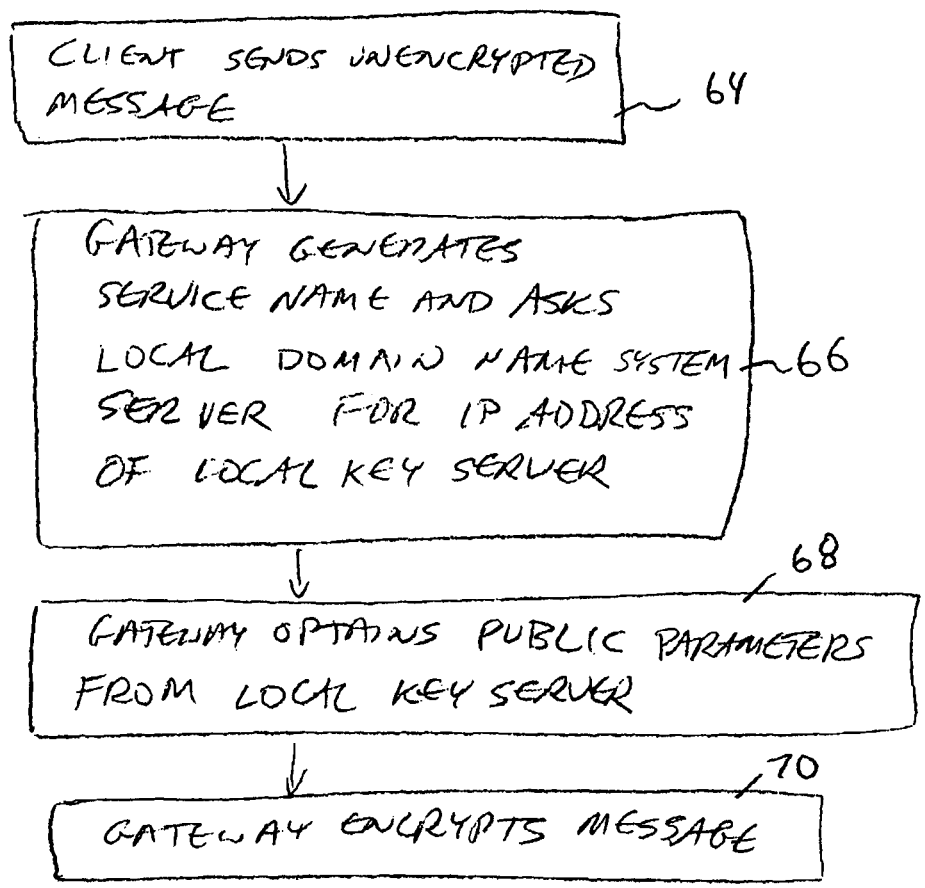
FIG. 5 is a flow chart of illustrative steps involved in sending secure messages from a sender at an organization with a gateway that handles encryption to a remote recipient in accordance with an embodiment of the present invention.

At step 64 of FIG. 5, the sender's client may be used to send an unencrypted version of a message to the recipient over network 34.

At step 66, gateway 36 may intercept the outgoing message. If desired, gateway 36 may scan the outgoing message to determine whether or not the message has sensitive attributes that indicate that the message should be encrypted. If sensitive attributes are detected, gateway 36 may obtain the IBE public parameters for encryption. Alternatively, gateway 36 may be configured to encrypt all outgoing messages, in which case gateway 36 may proceed with obtaining the IBE public parameters without performing a scan of the outgoing message. In obtaining the IBE public parameters at step 66, the gateway generates a service name corresponding to local key server 40 and, with this service name, requests a corresponding IP address for local key server 40 from local domain name system server 38. Using the IP address from local domain name system server 38 (e.g., IPADD1), gateway 36 may then obtain the IBE public parameters from local key server 40 (step 68).

At step 70, the gateway may use an IBE encryption engine, the newly obtained IBE public parameters, and the IBE public key of the remote recipient to encrypt the message for the recipient. The message may then be provided to the recipient over network 14.

Figure 6:
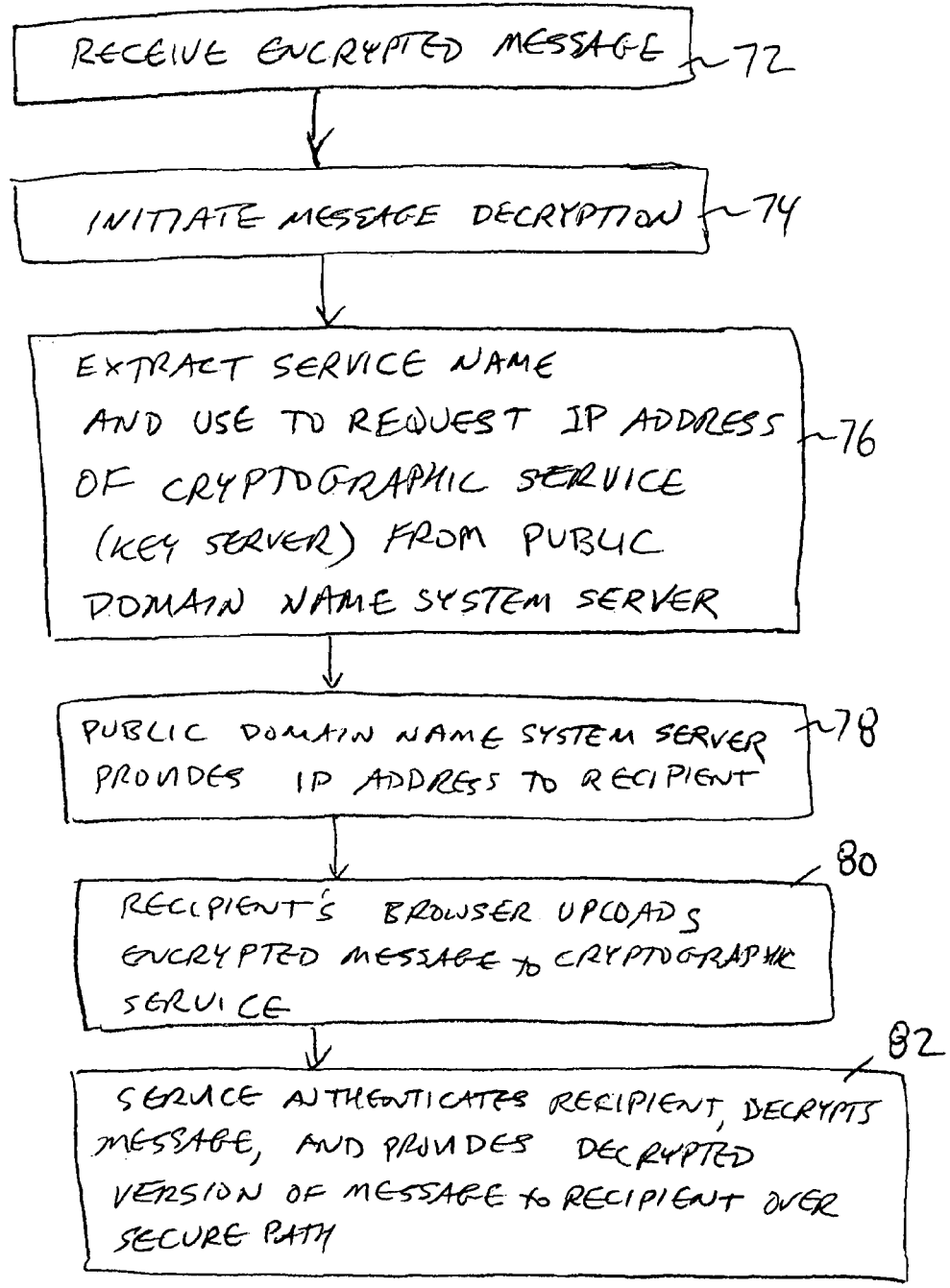
FIG. 6 is a flow chart of illustrative steps involved in receiving an encrypted message at a remote user and performing decryption operations using a decryption service in accordance with an embodiment of the present invention.
Figure 7:
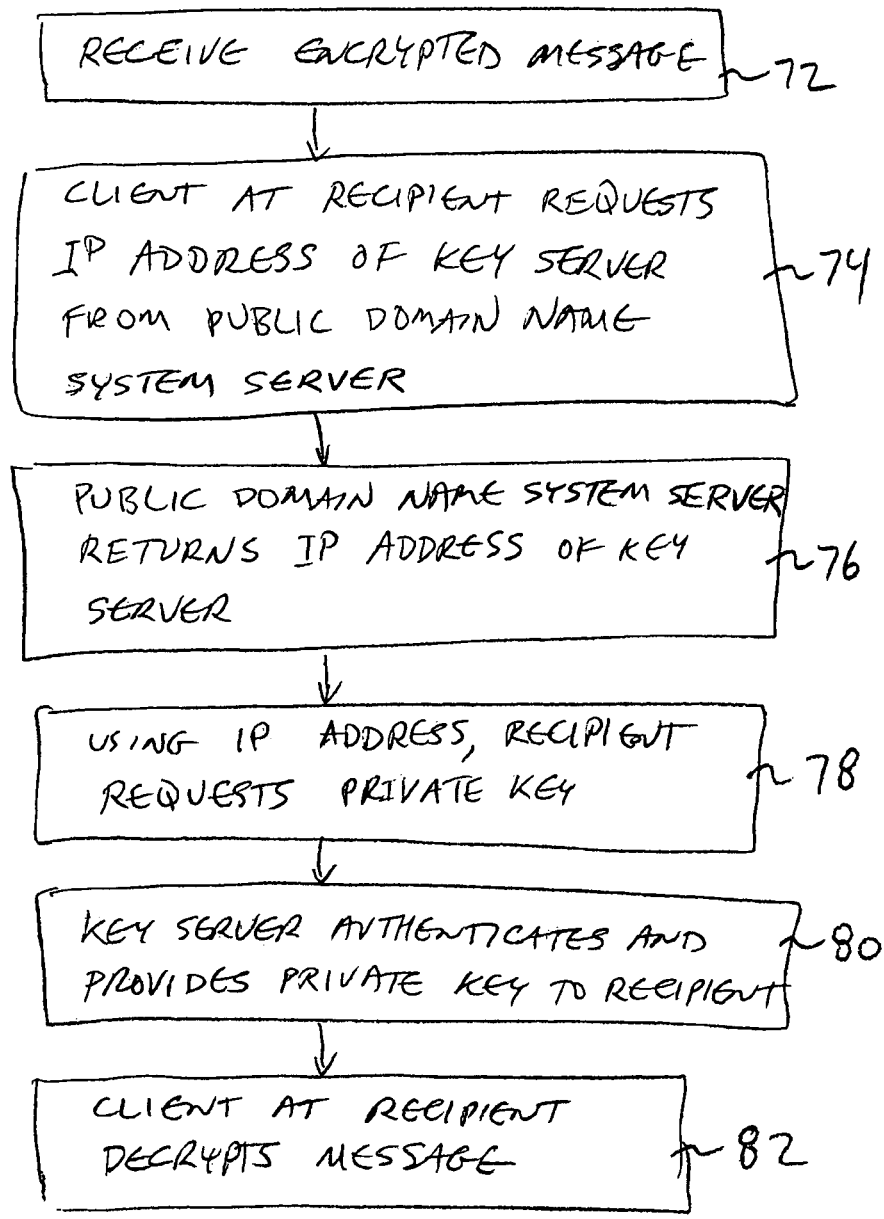
FIG. 7 is a flow chart of illustrative steps involved in receiving an encrypted message at a remote user and performing decryption operations using a client application implemented on the equipment of that user in accordance with an embodiment of the present invention.

Illustrative steps involved in receiving an IBE-encrypted message at the remote recipient of FIG. 3 (i.e., the user 12 connected to network 14) are shown in FIG. 6. In the example of FIG. 6, the recipient does not have an installed IBE encryption engine 18. Accordingly, the recipient uses the decryption capabilities of a remote decryption service (e.g., cryptographic service 46).

At step 72, the recipient may receive the IBE-encrypted message. The IBE-encrypted message may include instructions for the recipient on how to decrypt the message. As an example, the IBE-encrypted message may be presented to the user in the form of an email with an attachment. The body of the email may contain instructions that direct the message recipient to open the attachment. When the recipient follows these directions by opening the attachment, the recipient may be presented with an on-screen "read message" option. When the recipient clicks on the read message option, the decryption process may proceed.

As indicated by step 76, a service name that identifies the network location of cryptographic service 46 may be obtained from the received IBE-encrypted email (e.g., "voltage-pp-0000.acme.com" in the present example). The recipient may request the IP address for cryptographic service 46 (key server 48) by presenting public domain name system server 44 with the service name. After the public domain name system server 44 has responded by providing the requested IP address (e.g., IPADD2) to the recipient (step 78), the recipient may upload the IBE-encrypted message to cryptographic service 46 over network 14 (step 80). The operations of steps 76, 78, and 80 may be handled, for example, by a web browser at the recipient.

At step 82, cryptographic service 46 may authenticate the recipient (e.g., by requesting a password). Once the user has been successfully authenticated, cryptographic service 46 (key server 48) may generate the IBE private key for the recipient using master secret 50. Cryptographic service 46 may then use an IBE decryption engine to decrypt the uploaded IBE-encrypted message. The decrypted version of the message may be provided to the recipient securely over communications network 14 (e.g., using an SSL link).

As this example demonstrates, the same service name (e.g., "voltage-pp-0000.acme.com") may point to different IP addresses, depending on which domain name system (DNS) server is consulted. Within organization 32, local DNS server 38 may contain an entry for this service name that corresponds to IPADD1, which is the IP address of local key server 40 on network 34. Outside of organization 32, public DNS server 44 may contain an entry for the same service name that corresponds to IP address IPADD2, which corresponds to the IP address of public key server 48 on public network 14. Both local key server 40 and key server 48 have copies of the same master secret (i.e., master secret 50 and master secret 42 are the same), so either key server has the ability to handle requests for IBE public parameters and IBE private keys. Nevertheless, using the architecture of FIG. 3 in which the DNS entry of DNS server 38 points to key server 40 whereas the DNS entry of DNS server 44 points to key server 48, key server activities for users 12 at organization 32 are handled by local key server 40, whereas key server activities for users 12 that are outside of organization 32 are handled by key server 48.

This division of resources may help to alleviate burdens on local key server 40. For example, in a scenario in which numerous IBE-encrypted messages are distributed to recipients outside of organization 32, the resources of cryptographic service 46 may be used to handle cryptographic operations, rather than the resources of local key server 40. Local key server 40 is therefore not overwhelmed by service requests (e.g., IBE private key requests and/or IBE public parameter requests) from external users.

Figure 8:
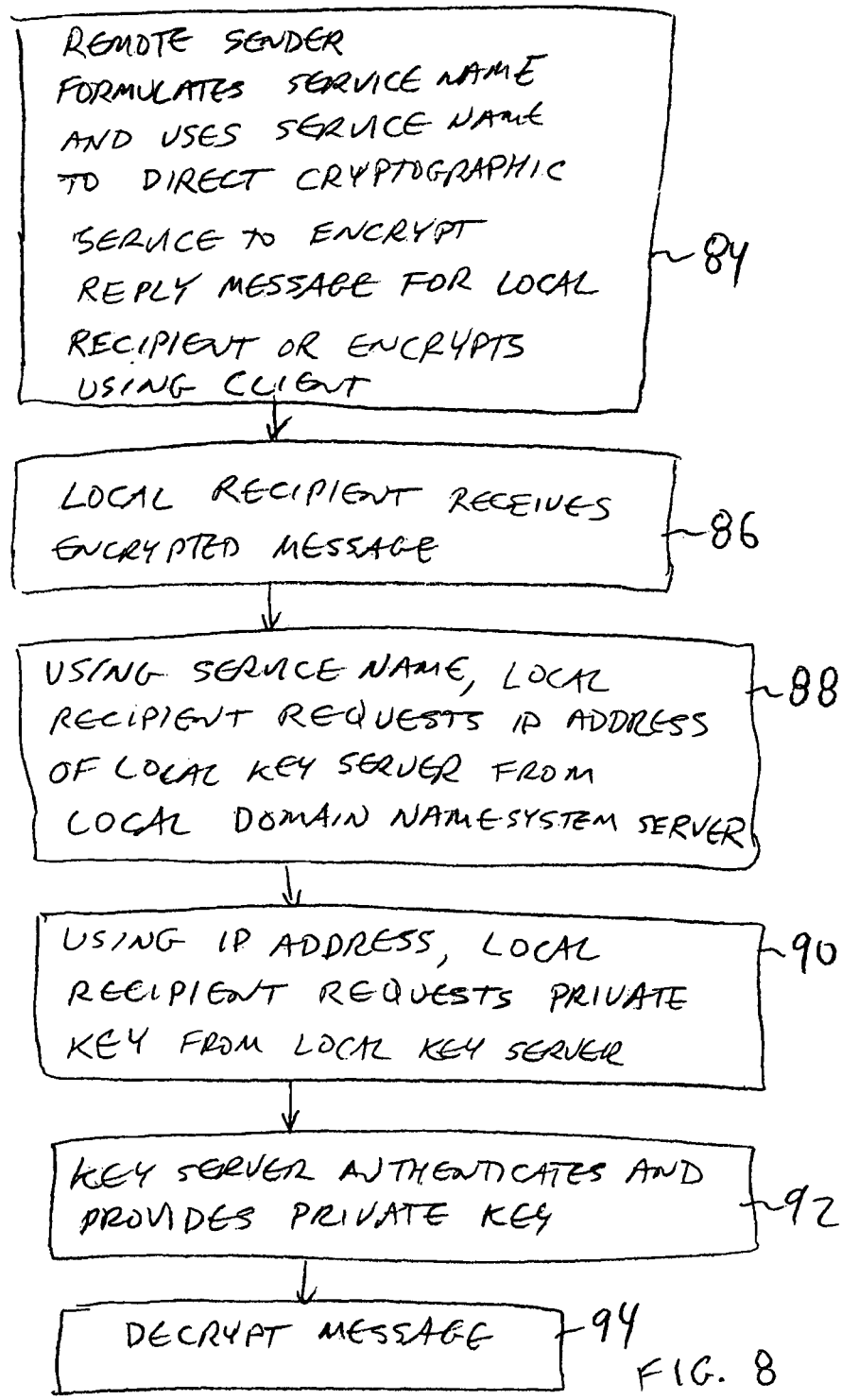
FIG. 8 is a flow chart of illustrative steps involved in sending secure messages from a remote sender to a local recipient in accordance with an embodiment of the present invention.

In the illustrative scenario of FIG. 6, the recipient of the IBE-encrypted message does not have local decryption software, so the services of cryptographic service 46 may be used to perform cryptographic operations such as message decryption. Illustrative steps involved in decrypting the IBE-encrypted message from the sender at a remote user 12 of FIG. 3 with an installed IBE client are shown in FIG. 8.

At step 72, the recipient may receive the IBE-encrypted message over network 14.

At step 74, the IBE-enabled client at the recipient formulates a service name (e.g., "voltage-pp-0000.acme.com") that corresponds to key server 48 and, using that service name, requests the IP address of key server 48 from public domain name system server 44.

At step 76, public domain name system server 44 provides the IP address of key server 48 (IPADD2 in this example) to the recipient over network 14.

At step 78, using the IP address, the recipient's client requests an IBE private key for decrypting the IBE-encrypted message from IBE key server 48 over network 14.

At step 80, key server 48, in response to the IBE private key request from the remote recipient, authenticates the recipient. If the recipient is successfully authenticated, key server 48 may use master secret 50 to generate the recipient's IBE private key. The IBE private key may then be provided to the recipient over network 14.

At step 82, the recipient's client receives the requested IBE private key. Using an IBE decryption engine, the client may then decrypt the IBE-encrypted message and provide the unencrypted message to the recipient.

A remote user may desire to send an IBE-encrypted message to a user at an organization. For example, a remote user may wish to reply to an IBE-encrypted message that has been received. Illustrative steps involved in sending IBE-encrypted messages from remote senders (i.e., senders outside of organization 32) to local recipients (i.e., recipients within organization 32) are shown in FIG. 8.

At step 84, a remote sender may use information on the desired recipient of the message (e.g., information on the organization of the sender of a message to which the remote sender wishes to reply) to formulate a service name. The service name (e.g., "voltage-pp-0000.acme.com") may be generated based on information from a received IBE-encrypted message. The service name identifies key server 48. This service name may be provided to public DNS server 44, which returns a corresponding IP address for cryptographic service 46 (key server 48). If the sender has a client with an IBE encryption engine, the client may use the IP address to obtain the recipient's IBE public parameters and, using these IBE public parameters, may encrypt the message for the recipient. If the sender does not have a client with an IBE encryption engine, the sender can upload the message to cryptographic service 46 for encryption. The encrypted message may be sent to the recipient at organization 32 over network 14.

At step 86, the local recipient at organization 32 may receive the IBE-encrypted message.

At step 88, the local recipient may formulate a service name that identifies local key server 40 (e.g., the URL "voltage-pp-0000.acme.com" in the present example). The local recipient may request a corresponding IP address by providing this URL to local DNS server 38 over network 34. Local DNS server 38 may, in response, provide the local recipient with the IP address corresponding to the service name URL (e.g., IPADD1 in this example).

At step 90, the local recipient may use the IP address of local key server 40 (IPADD1) to request a copy of the local recipient's IBE private key from local key server 40.

At step 92, local key server 40 may authenticate the requesting local recipient. If the local recipient is successfully authenticated, the requested IBE private key of the local recipient may be supplied to the local recipient over network 34.

At step 94, the local recipient may use the IBE private key from local key server 40 to decrypt the encrypted message. If desired, gateway 36 may perform optional preprocessing of incoming encrypted messages. For example, gateway 36 may decrypt messages, scan messages for viruses, and reencrypt scanned messages. As part of this process, gateway 36 may formulate a key request for key server 40 using the service name.

In situations such as the situation illustrated in the flow chart of FIG. 8, public key server 48 may be used to provide IBE public parameter information that is used during the encryption process and local key server 40 is being used to service IBE private key requests to support decryption operations. This helps to avoid overburdening local key server 40 with IBE public parameter requests, while allowing local key server 40 to be used to generate IBE private keys for the users associated with organization 32.

System 10 of FIG. 3 may be set up by migrating an existing system with only on-premises key server functionality to an arrangement having both the local key server 40 and remote key server 48. Illustrative steps involved in performing this type of system migration are shown in FIG. 9.

Figure 9:
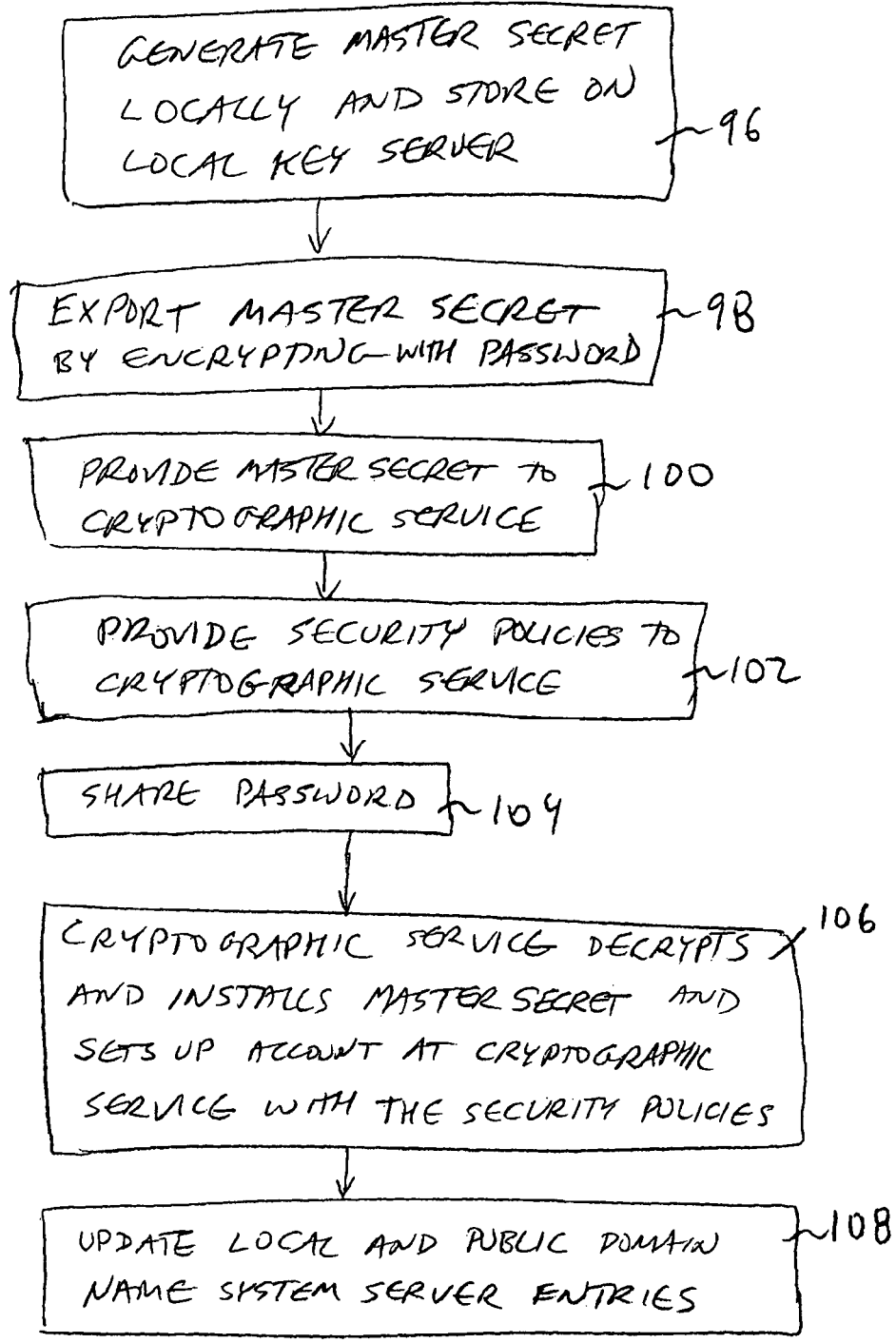
FIG. 9 is a flow chart of illustrative steps involved in migrating a system set up from an on-premises arrangement to a system of the type shown in FIG. 3 in accordance with an embodiment of the present invention.

In the example of FIG. 9, it is assumed that local key server 40 has been set up at organization 32 and has been provided with master secret 42 (step 96).

At step 98, master secret 42 may be exported by, for example, encrypting master secret 42 with a password.

At step 100, the password-encrypted master secret may be provided to cryptographic service 46 (e.g., electronically over network 14 or using other suitable delivery mechanisms).

At step 102, cryptographic service 46 may be informed of the security policies associated with organization 32. For example, authentication rules may be stored at cryptographic service 46 that govern what types of authentication methods are required before granting a requester access to cryptographic information such as IBE public parameters and IBE private keys. As an example, IBE public parameters may be provided to any requester without authentication and IBE private keys may be provided only to requesters that can prove their identities through a username/password scheme.

At step 104, the password that was used to encrypt the master secret may be provided to cryptographic service 46 (e.g., electronically, by physical delivery, etc.).

At step 106, cryptographic service 46 may use the shared password to decrypt the password-protected master secret. The master secret may then be installed on key server 48. The copy of master secret 42 from local key server 40 that is installed at cryptographic service 46 is shown as master secret 50 in FIG. 3.

At step 108, local domain name system server 38 and public domain name system server 44 may be updated. When local key server 96 was initially set up (e.g., step 96), DNS server 38 and DNS server 44 may have each been provided with an entry that mapped a service name for local key server 40 to an IP address for local key server 40 (e.g., IPADD1). In the absence of key server 48, this IP address may have been used by internal and external users to access key server 40. During the migration operations of steps 98, 100, 102, and 108, key server 48 was provided with a copy of the master secret and was set up to service remote users. Accordingly, during step 108, public DNS server 44 may be updated so that the same service name that previously pointed to the IP address of local key server 40 now points to the IP address of key server 48 (e.g., IPADD2).

Figure 10:
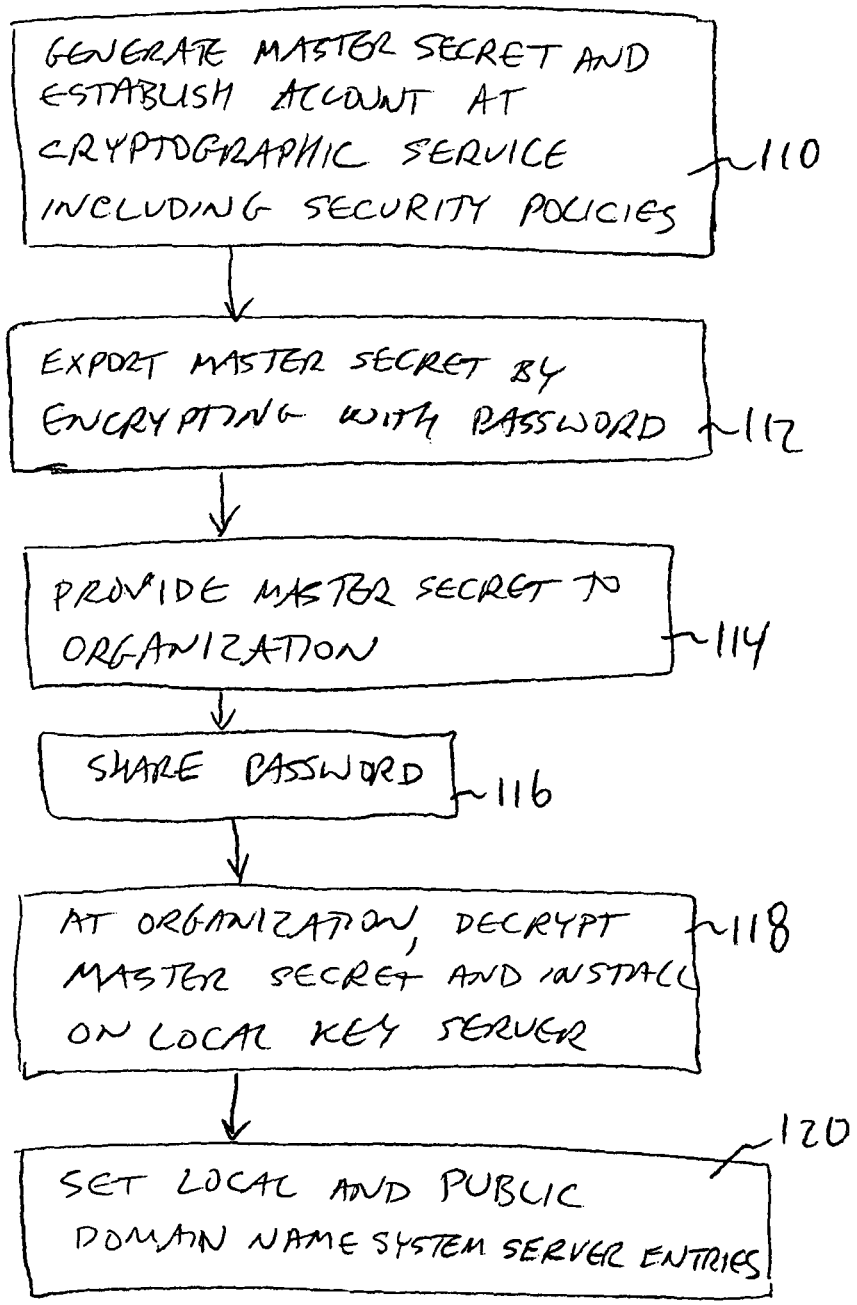
FIG. 10 is a flow chart of illustrative steps involved in initially setting up a system of the type shown in FIG. 3 in accordance with an embodiment of the present invention.

A similar setup process may be used when setting up a system of the type shown in FIG. 3 starting from a situation in which no local key server is set up. Illustrative steps involved in this setup process are shown in FIG. 10.

At step 110, master secret 50 may be generated and stored at key server 48 and associated with an account established for organization 32. Security policies may be associated with the account that imposes conditions on access to IBE private keys and other cryptographic information. For example, the security policies may dictate that IBE private keys will only be provided to IBE private key requesters who authenticate themselves using a password.

At step 112, master key 50 may be exported by encrypting master secret 50 with a password. The encrypted version of master secret 50 may be provided to organization 32 electronically or using other suitable delivery mechanisms (step 114).

At step 116, the password that was used to encrypt master secret 50 may be shared with organization 32 (e.g., via electronic delivery, etc.).

At step 118, decryption software at organization 32 may be used to decrypt the encrypted version of the master secret. This copy of the master secret (which is identical to master secret 50 at key server 48) may be stored locally as master secret 42 at local key server 40.

At step 120, local domain name system server 38 and public domain name system server 44 may be provided with entries that map the shared service name for key servers 48 and 40 to respective unique IP addresses. For example, server 44 may be provided with an entry that maps the service name to the IP address (e.g., IPADD2) of cryptographic service 46 (key server 48), whereas server 38 may be provided with an entry that maps the same service name to the IP address (e.g., IPADD1) of local key server 40.

The messages that are encrypted using the identity-based-encryption techniques described in connection with FIGS. 1-10 may be any suitable files or data (e.g., stand-alone files such as word processing documents or spreadsheets, email messages with or without attachments, etc.). In the embodiments described in connection with FIGS. 1-10, messages are sometimes said to be conveyed electronically (e.g., using email). If desired, a system of the type shown in FIG. 3 may be used to encrypt and decrypt files regardless of whether or not those files are transferred electronically over network 14.

Figure 11:
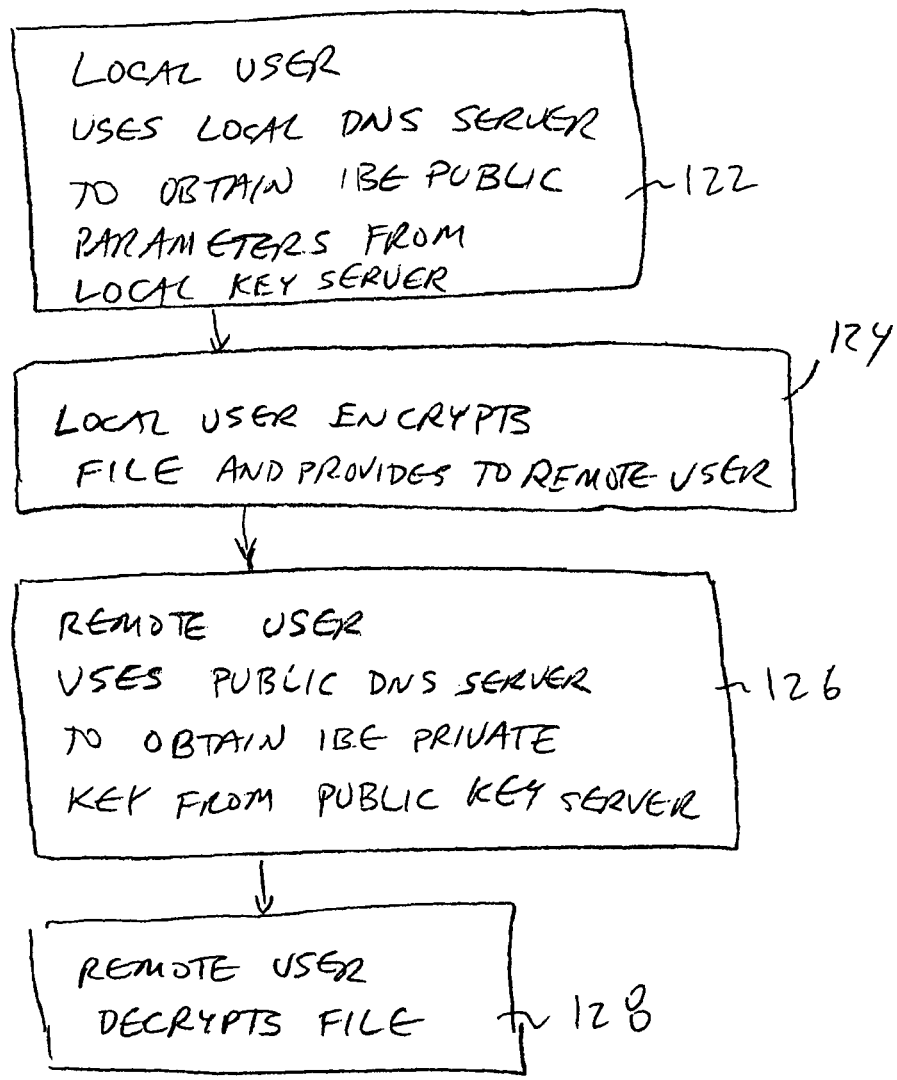
FIGS. 11 and 12 are flow charts of illustrative steps involved in using a system of the type shown in FIG. 3 to perform encryption and decryption of files in accordance with an embodiment of the present invention.
Figure 12:
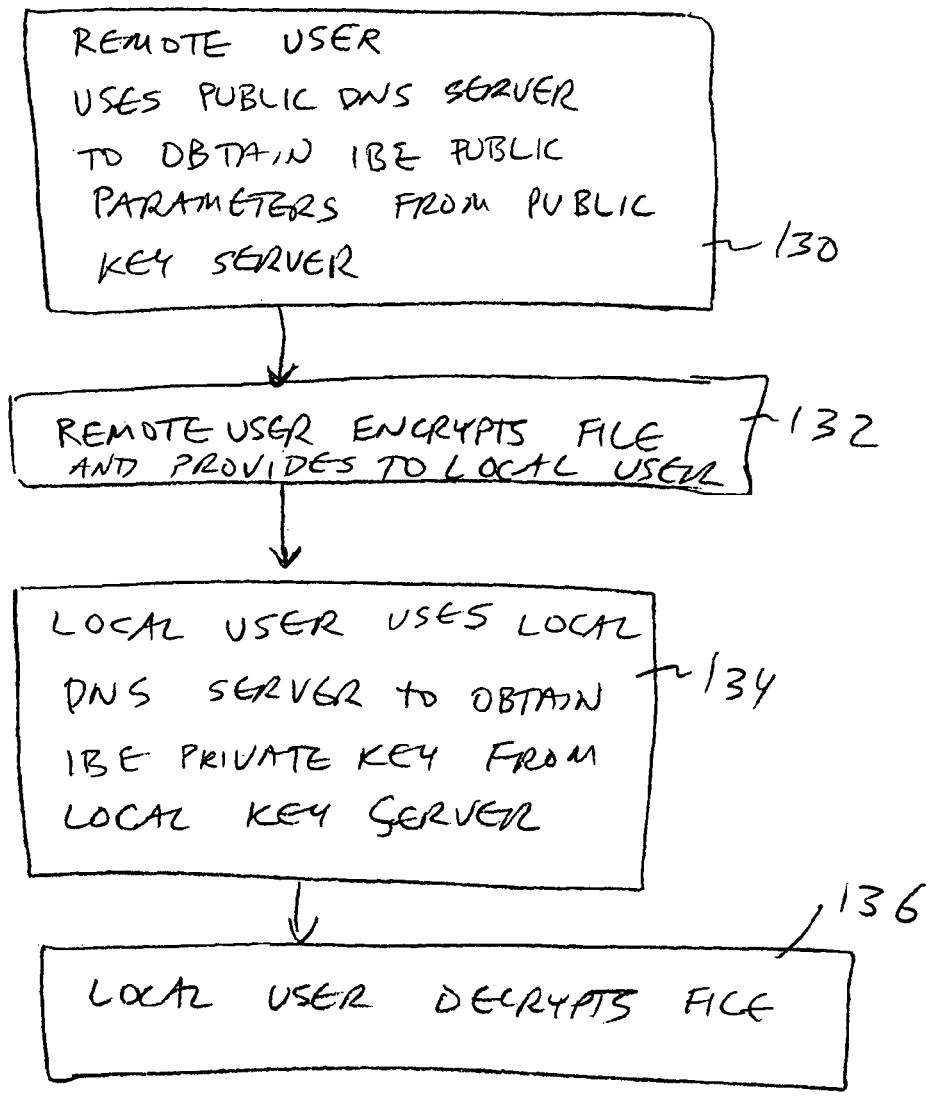

This is illustrated in the flow charts of FIGS. 11 and 12. The flow chart of FIG. 11 sets forth operations related to encrypting a file locally (i.e., within organization 32) while decrypting the file remotely (i.e., external to organization 32). The flow chart of FIG. 12 sets forth operations related to encrypting a file remotely (i.e., external to organization 32) while decrypting the file locally (internal to organization 32). Because of their different locations, the encrypting user and the decrypting user are referred to as "local" and "remote" users in FIGS. 11 and 12. These terms may refer to different individuals or the same individual. For example, the terms "local user" and "remote user" may refer to the same individual in situations in which a user encrypts a file at work using equipment internal to an organization and later decrypts the file at home using equipment external to the organization.

FIG. 11 illustrates a local encryption and remote decryption scenario.

At step 122, a local user 12 generates a service name and, using local DNS server 38, obtains an IP address for local key server 40 based on the service name. The local user then contacts local key server 40 to obtain IBE public parameters.

Using an appropriate IBE public key (e.g., a public key based on the user's identity or other individual's identity, etc.) and the IBE public parameters, the local user may encrypt a file at step 124. File encryption may be performed using an IBE encryption engine such as a plug-in to a word processing program or other application or using an encryption function that is accessed by a menu option that is presented to the user when right-clicking on the file within the user's file system. After the file has been encrypted, the local user may make the file available to a remote user (e.g., by transferring the file over a network, by storing the file on a memory card, by making the file available for downloading by the remote user via the web or an FTP server, etc.). These techniques for making the IBE-encrypted file available to equipment that is external to the organization may or may not involve electronic transmission over network 14.

At step 126, the remote user may generate a service name for public key server 48 (i.e., the same service name generated locally at step 122) and, using public DNS server 44 may request a corresponding IBE private key from public key server 48. Following authentication of the remote user by the key server, the IBE private key may be provided to the remote user.

At step 128, the remote user may use the requested IBE private key and a decryption engine on the remote user's equipment to decrypt the IBE-encrypted file.

FIG. 12 illustrates operations involved in a remote encryption and local decryption scenario.

At step 130, a remote user 12 generates a service name corresponding to public key server 50 and, using public DNS server 44 contacts public key server 50 to obtain IBE public parameters.

Using an appropriate IBE public key (e.g., a key based on the user's identity or other individual's identity) and the IBE public parameters, the remote user may encrypt a file at step 132. As with the local encryption scenario, file encryption at the equipment of the remote user may be performed using an IBE encryption engine such as a plug-in to a word processing program or other application or using an encryption function that is accessed by a menu option that is presented to the user when right-clicking on the file within the user's file system. After the file has been encrypted, the remote user may make the file available to a local user (e.g., by transferring the file over a network, by storing the file on a memory card and providing the card to the local user, by making the file available for downloading by the local user from a web site or an FTP server, etc.).

At step 134, the local user may generate a service name for local key server 40 (i.e., the same service name that was generated at step 130) and, using local DNS server 38 may request a corresponding IBE private key from local key server 40. Following authentication of the local user by the key server, the IBE private key may be provided to the local user.

At step 136, the local user may use the requested IBE private key and a decryption engine to decrypte the IBE-encrypted file.

The foregoing is merely illustrative of the principles of this invention and various modifications can be made by those skilled in the art without departing from the scope and spirit of the invention.

What is claimed is:

1. A method for supporting communications in an identity-based encryption (IBE) system in which a message encrypted using an IBE public key of a recipient external to an organization is to be sent over a communications network from a sender within the organization, comprising:
    at the sender, obtaining an internet protocol (IP) address of a local key server at the organization by presenting a given service name to a local domain name system server at the organization;
    obtaining IBE public parameter information from the local key server using the IP address;
    encrypting a message from the sender to create an IBE-encrypted message using the IBE public parameter information and the IBE public key of the recipient;
    sending the IBE-encrypted message to the recipient;
    at the recipient, obtaining an IP address of a public key server by presenting the given service name to a public domain name system server;
    obtaining an IBE private key from the public key server using the IP address of the public key server; and
    decrypting the IBE-encrypted message for the recipient using the IBE private key.

2. The method defined in claim 1 wherein obtaining the IBE public parameter information from the local key server comprises generating the IBE public parameter information from a master secret at the local key server.

3. The method defined in claim 2 wherein obtaining the IBE private key comprises generating the IBE private key from the master secret at the public key server.

4. The method defined in claim 3 wherein the public key server is located at a cryptographic service connected to the Internet and wherein decrypting the IBE-encrypted message comprises uploading the IBE encrypted message to the cryptographic service from the recipient over the Internet.

5. The method defined in claim 3 wherein decrypting the IBE-encrypted message comprises:
    at the recipient, receiving the IBE private key from the public key server over the Internet and decrypting the IBE-encrypted message.

6. The method defined in claim 1 further comprising providing the public domain name system server with an entry that maps the given service name to the IP address of the public key server and providing the local domain name system server with an entry that maps the same service name to the IP address of the local key server, wherein the IP address of the public key server and the IP address of the local key server are different.

7. The method defined in claim 1 further comprising:
    at the sender, constructing the given service name at least partly using a name associated with the organization.

8. The method defined in claim 7 further comprising:
    at the recipient, constructing the given service name at least partly using a name associated with the organization.

9. The method defined in claim 1 further comprising:
    at the recipient, constructing the given service name at least partly using a name associated with the organization.

10. The method defined in claim 9 wherein obtaining the IBE public parameter information from the local key server comprises generating the IBE public parameter information from a master secret at the local key server.

11. The method defined in claim 10 wherein obtaining the IBE private key comprises generating the IBE private key from the master secret at the public key server.

12. A system for supporting secure identity based-encryption (IBE) communications between a first user's computing equipment and a second user's computing equipment, comprising:
- a network at an organization, wherein the first user's computing equipment is associated with the organization and is connected to the network at the organization;
- a local domain name system server at the organization that is connected to the network at the organization;
- a local key server at the organization that is connected to the network of the organization;
- a communications network based at least partly on the Internet, wherein the second user's computing equipment is connected to the communications network and is external to the organization;
- a public domain name system server that is connected to the communications network; and
- a public key server that is connected to the communications network, wherein the local key server and the public key server both maintain copies of an identical IBE master secret that is used in generating IBE private keys, wherein the local key server and the public key server are associated with the same service name, wherein the local domain name system server contains an entry mapping the service name to a first Internet Protocol (IP) address, and wherein the public domain name system server contains an entry mapping the same service name to a second IP address that is different from the first IP address.

13. The system defined in claim 12 further comprising a gateway at the organization that is connected to the network at the organization and that is connected to the communications network, wherein the gateway is configured to generate the service name at least partly from a name associated with the organization.

14. A method for supporting secure identity based-encryption (IBE) communications between a sender external to an organization and a recipient internal to the organization, comprising:
- external to the organization:
  - generating a service name at least partly using information that identifies the organization;
  - obtaining a first Internet Protocol (IP) address from a public domain name system server using the service name, wherein the first IP address is associated with a key server external to the organization that maintains an IBE master secret; and
  - sending an IBE-encrypted message to the recipient that is encrypted using IBE public parameter information generated by the key server external to the organization based at least partly on the IBE master secret; and
- at the organization:
  - generating the service name; and
  - obtaining a second Internet Protocol (IP) address from a local domain name system server that is within the organization using the service name, wherein the second IP address is associated with a local key server internal to the organization that maintains the IBE master secret, wherein the IBE master secret maintained at the local key server and the IBE master secret maintained at the key server external to the organization are identical.

15. The method defined in claim 14 further comprising:
at the sender, obtaining the IBE public parameter information from the key server external to the organization.

16. The method defined in claim 14 wherein the key server external to the organization is associated with a cryptographic service, the method further comprising:
at the cryptographic service, encrypting a message from the sender to create the IBE-encrypted message using the IBE public parameter information.

17. The method defined in claim 14 further comprising:
at the organization, requesting an IBE private key from the local key server using the second IP address.

18. The method defined in claim 17 further comprising:
at the organization, decrypting the IBE encrypted message using the requested IBE private key.

19. The method defined in claim 18 further comprising:
requesting IBE public parameter information from the local key server using the second IP address.

20. The method defined in claim 19 further comprising:
requesting an IBE private key from the key server external to the organization using the first IP address.

21. A method for securing files in an identity-based encryption (IBE) system in which a file is encrypted using an IBE public key, comprising:
- at a local user internal to an organization, obtaining an internet protocol (IP) address of a local IBE key server at the organization by presenting a service name to a local domain name system server at the organization;
- obtaining IBE public parameter information from the local IBE key server using the IP address;
- encrypting a file at the local user to create an IBE-encrypted file using the IBE public parameter information and an IBE public key;
- at equipment external to the organization, obtaining an IP address of a public IBE key server by presenting the service name to a public domain name system server;
- at the equipment external to the organization, obtaining an IBE private key from the public IBE key server using the IP address of the public key server; and
- at the equipment external to the organization, decrypting the IBE-encrypted file using the IBE private key.

* * * * *